(12) United States Patent
Li et al.

(10) Patent No.: US 11,892,724 B2
(45) Date of Patent: Feb. 6, 2024

(54) DISPLAY SUBSTRATE, METHOD FOR MANUFACTURING DISPLAY SUBSTRATE, AND LIQUID CRYSTAL DISPLAY PANEL

(71) Applicants: Hefei BOE Display Technology Co., Ltd., Anhui (CN); BOE TECHNOLOGY GROUP CO., LTD., Beijing (CN)

(72) Inventors: Yajun Li, Beijing (CN); Tao Yang, Beijing (CN)

(73) Assignees: Hefei BOE Display Technology Co., Ltd., Anhui (CN); BOE TECHNOLOGY GROUP CO., LTD., Beijing (CN)

( * ) Notice: Subject to any disclaimer, the term of this patent is extended or adjusted under 35 U.S.C. 154(b) by 174 days.

(21) Appl. No.: 17/432,154

(22) PCT Filed: Nov. 18, 2020

(86) PCT No.: PCT/CN2020/129700
§ 371 (c)(1),
(2) Date: Aug. 19, 2021

(87) PCT Pub. No.: WO2022/104582
PCT Pub. Date: May 27, 2022

(65) Prior Publication Data
US 2022/0350195 A1    Nov. 3, 2022

(51) Int. Cl.
G02F 1/1335    (2006.01)
G02F 1/1337    (2006.01)
G02F 1/1339    (2006.01)

(52) U.S. Cl.
CPC ...... *G02F 1/133516* (2013.01); *G02F 1/1337* (2013.01); *G02F 1/13394* (2013.01); *G02F 1/133512* (2013.01)

(58) Field of Classification Search
CPC ............. G02F 1/133516; G02F 1/1337; G02F 1/1339; G02F 1/13394; G02F 1/133357;
(Continued)

(56) References Cited

U.S. PATENT DOCUMENTS 6,975,379 B2  12/2005  Kim et al.
7,286,199 B2  10/2007  Moriya
(Continued)

FOREIGN PATENT DOCUMENTS

CN    1379272 A    11/2002
CN    108089377 A    5/2018
(Continued)

OTHER PUBLICATIONS

China Patent Office, First Office Action dated Dec. 8, 2022, for corresponding Chinese application 202080002850.9.

*Primary Examiner* — Angela K Davison
(74) *Attorney, Agent, or Firm* — HOUTTEMAN LAW LLC (57) ABSTRACT

There are provided a display substrate, a method for manufacturing a display substrate, and a liquid crystal display panel, the display substrate includes: a color filter layer disposed on a base; at least one cover layer positioned on a side of the color filter layer away from the base and including a first cover layer which is in contact with the color filter layer; at least one optical compensation layer, where each optical compensation layer is positioned on a side of the first cover layer away from the base and is configured to compensate a phase delay of light emitted from a liquid crystal layer of the liquid crystal display panel; and a spacer positioned on the side of the first cover layer away from the base and being in contact with one of the at least one cover layer.

16 Claims, 6 Drawing Sheets

(58) Field of Classification Search
CPC ........... G02F 1/133519; G02F 1/13363; G02F 2413/05; G02B 5/3083
See application file for complete search history.

(56) References Cited

U.S. PATENT DOCUMENTS

| | | |
|---|---|---|
| 2002/0140888 A1 | 10/2002 | Nishiyama et al. |
| 2003/0117570 A1 | 6/2003 | Kim |
| 2019/0258118 A1 | 8/2019 | Mizusaki |
| 2019/0285924 A1* | 9/2019 | Koide ............... G02F 1/133528 |
| 2020/0303671 A1 | 9/2020 | Song |
| 2020/0371399 A1 | 11/2020 | Liu et al. |

FOREIGN PATENT DOCUMENTS

| | | |
|---|---|---|
| CN | 108303830 A | 7/2018 |
| CN | 108630829 A | 10/2018 |
| CN | 109791326 A | 5/2019 |
| CN | 111025781 A | 4/2020 |
| JP | 2005003750 A | 1/2005 |

\* cited by examiner

DISPLAY SUBSTRATE, METHOD FOR MANUFACTURING DISPLAY SUBSTRATE, AND LIQUID CRYSTAL DISPLAY PANEL

TECHNICAL FIELD

The present disclosure relates to the field of display technology, and in particular to a display substrate, a method for manufacturing a display substrate and a liquid crystal display panel.

BACKGROUND

LCDs (Liquid crystal displays) have been widely used in the field of display technology, but the LCDs have a problem of light leakage in dark state.

SUMMARY

The present disclosure provides a display substrate, a method for manufacturing a display substrate and a liquid crystal display panel.

In a first aspect, an embodiment of the present disclosure provides a display substrate, applied as a substrate on a light exiting side of a liquid crystal display panel, the display substrate includes:
a base;
a color filter layer disposed on the base;
at least one cover layer positioned on a side of the color filter layer away from the base and including a first cover layer which is in contact with the color filter layer;
at least one optical compensation layer, where each optical compensation layer is positioned on a side of the first cover layer away from the base and is configured to compensate a phase delay of light emitted from a liquid crystal layer of the liquid crystal display panel; and
a spacer positioned on a side of the first cover layer away from the base and being in contact with one of the at least one cover layer.

In some implementations, the optical compensation layer is a cured liquid crystal film, and the display substrate further includes:
a first alignment layer in one-to-one correspondence with the optical compensation layer, the first alignment layer being located between the optical compensation layer corresponding thereto and the first cover layer;
a second alignment layer;
where each optical compensation layer is located between the second alignment layer and the first alignment layer.

In some implementations, the at least one cover layer further includes:
a second cover layer between the second alignment layer and the optical compensation layer adjacent thereto;
the spacer is arranged in contact with the second cover layer, and the second alignment layer covers at least partial area of the spacer other than a contact area of the spacer on the second cover layer.

In some implementations, the spacer is disposed in contact with the first cover layer, and the first alignment layer covers at least partial area of the spacer other than a contact area of the spacer on the first cover layer.

In some implementations, the second alignment layer is disposed in contact with the optical compensation layer.

In some implementations, the display substrate further includes: a black matrix positioned between the first cover layer and the base.

In a second aspect, an embodiment of the present disclosure provides a method for manufacturing a display substrate, where the display substrate is applied as a substrate on a light exiting side of a liquid crystal display panel, the method includes:
forming a color filter layer on a base;
forming at least one cover layer on a side of the color filter layer away from the base, where the at least one cover layer includes a first cover layer which is in contact with the color filter layer;
forming at least one optical compensation layer, where each optical compensation layer is positioned on a side of the first cover layer away from the base and is configured to compensate a phase delay of light emitted from a liquid crystal layer of the liquid crystal display panel; and
forming a spacer positioned on the side of the first cover layer away from the base and being in contact with one of the at least one cover layer.

In some implementations, before forming the spacer, the method further includes:
performing a plasma process on a surface of the first cover layer;
forming a first alignment layer in one-to-one correspondence with the optical compensation layer, each first alignment layer being formed before forming the optical compensation layer corresponding thereto;
where the forming the optical compensation layer includes:
forming and curing a liquid crystal material layer to form the optical compensation layer.

In some implementations, the at least one cover layer further includes:
a second cover layer positioned on a side of the optical compensation layer away from the base;
before forming the first alignment layer, the method further includes:
rinsing the surface of the first cover layer with a first solution;
the forming the spacer includes:
performing a plasma process on a surface of the second cover layer;
forming a spacer material layer on the surface of the second cover layer;
exposing the spacer material layer, and developing the exposed spacer material layer by using the first solution to form a pattern of the spacer;
after forming the spacer, the method further includes:
forming a second alignment layer, where the second alignment layer covers at least partial area of the spacer other than a contact area of the spacer on the second cover layer.

In some implementations, the forming the spacer includes:
forming a spacer material layer on the surface of the first cover layer;
exposing the spacer material layer, and developing the exposed spacer material layer by using a first solution to form a pattern of the spacer;
where the first alignment layer is formed after the spacer is formed, and the first alignment layer at least covers at least partial area of the spacer other than a contact area of the spacer on the first cover layer;
after forming the spacer, the method further includes:

forming a second alignment layer on a side of the optical compensation layer away from the base.

In some implementations, the forming the second alignment layer is immediately adjacent to forming one of the at least one optical compensation layer such that the second alignment layer is in contact with the optical compensation layer.

In some implementations, before forming the color filter layer, the method further includes:

forming a black matrix between the first cover layer and the base.

In a third aspect, an embodiment of the present disclosure further provides a liquid crystal display panel, which includes the display substrate in the foregoing embodiment.

DESCRIPTION OF DRAWINGS

The accompanying drawings, which are included to provide a further understanding of the present disclosure and are incorporated in and constitute a part of this specification, illustrate embodiments of the present disclosure and together with the description serve to explain the present disclosure, but do not constitute a limitation of the present disclosure. In the drawings.

DESCRIPTION OF EMBODIMENTS

To make objects, technical solutions and advantages of the embodiments of the present disclosure more apparent, the technical solutions of the embodiments of the present disclosure will be clearly and completely described below with reference to the drawings of the embodiments of the present disclosure. It is to be understood that the described embodiments are only a few embodiments of the present disclosure, and not all embodiments. All other embodiments, which can be derived by a person skilled in the art from the described embodiments of the present disclosure without creative works, are within the scope of protection of the present disclosure.

The terminologies used herein to describe embodiments of the present disclosure are not intended to limit and/or define the scope of the present disclosure. For example, unless defined otherwise, technical or scientific terms used in the present disclosure should have the same meaning as commonly understood by one of ordinary skill in the art to which the present disclosure belongs. It should be understood that the terms "first", "second", and the like, as used in the present disclosure, do not denote any order, quantity, or importance, but rather are used to distinguish one element from another. The singular forms "a", "an" or "the" and similar referents do not denote a limitation of quantity, but rather denote the presence of at least one, unless the context clearly dictates otherwise. Terms "upper", "lower" and the like are used merely to indicate relative positional relationships, which may also change accordingly when an absolute position of the object being described changes.

For liquid crystal displays, the problem of light leakage in dark state is common, and is more serious for an ADS (Advanced Super Dimension Switch) type liquid crystal display and an IPS (In-Plane Switching) type liquid crystal display.

Figure 1:
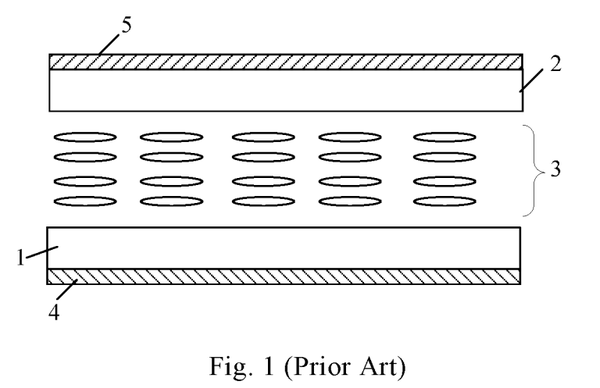
FIG. 1 is a schematic diagram of a liquid crystal display panel in the related art.

FIG. 1 is a schematic diagram of a liquid crystal display panel in the related art, and as shown in FIG. 1, the liquid crystal display panel includes an array substrate 1 and a color filter substrate 2 which are aligned and combined into a cell, and a liquid crystal layer 3 located between the array substrate 1 and the color filter substrate 2. A lower polarizer 4 is arranged on a side of the array substrate 1 away from the color filter substrate 2, and an upper polarizer 5 is arranged on a side of the color filter substrate 2 away from the array substrate 1. When displaying, a backlight source needs to be arranged to provide light for the liquid crystal display panel, and the light emitted by the backlight source sequentially passes through the lower polarizer 4, the array substrate 1, the liquid crystal layer 3, the color filter substrate 2 and the upper polarizer 5.

Taking the ADS type liquid crystal display panel as an example, liquid crystal molecules in the liquid crystal layer 3 each are in a horizontal state in an initial state, and have no twisting effect on light when no voltage is applied, so that a polarization direction of the light passing through the liquid crystal layer 3 is perpendicular to a direction of transmission axis of the upper polarizer 5, and the light cannot penetrate through the upper polarizer 5, the liquid crystal display panel is in dark state; when a voltage is applied, the liquid crystal molecules in the liquid crystal layer 3 each are deflected to distort the light, so that the polarization direction of the light is changed, the light can be emitted out through the upper polarizer 5, pictures are displayed, and the liquid crystal display panel is in a bright state.

Since bases of the array substrate 1 and the color filter substrate 2 are generally made of glass, and the glass has a birefringence effect on light, when the liquid crystal display panel is in dark state, the light passes through the array substrate 1 and then a birefringence phenomenon occurs, so that a polarization state of the light slightly changes; then, the light passes through the liquid crystal layer 3 and then undergoes birefringence again, and an amount of phase delay of the light is further increased, so that the polarization state changes significantly. Thus, the polarization direction of the light emitted from the liquid crystal layer 3 is no longer perpendicular to the direction of the transmission axis of the upper polarizer 5, so that a portion of the light may penetrate through the upper polarizer 5, thereby causing a problem of light leakage of the liquid crystal display panel in dark state. Particularly, when the liquid crystal display panel is subjected to external force such as squeezing, the problem of light leakage is more serious.

Figure 2:
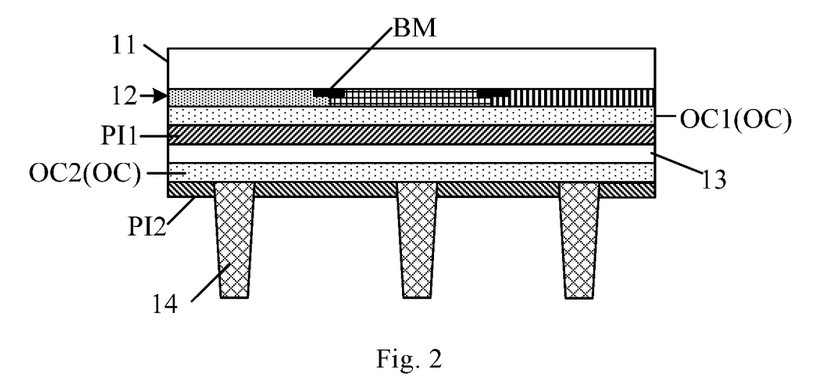
FIG. 2 is a schematic diagram of a display substrate according to some embodiments of the present disclosure.

FIG. 2 is a schematic diagram of a display substrate according to some embodiments of the present disclosure, and the display substrate is applied as a substrate on a light exiting side of a liquid crystal display panel, for example, the display substrate is applied as a color filter substrate of the liquid crystal display panel. As shown in FIG. 2, the display substrate includes: a base 11, a color filter layer 12, at least one cover layer OC, at least one optical compensation layer 13, and a plurality of spacers 14.

The base 11 may be made of a hard material such as glass, or may be made of a flexible organic material such as polyimide, polycarbonate, or polyacrylate. In some examples of the present disclosure, the base 11 is a glass base.

The color filter layer 12 is disposed on the base 11, and the color filter layer 12 includes a plurality of color blocks, and the color of the color blocks may be red, green, or blue. In some implementations, a black matrix BM is further disposed on the base 11, and orthogonal projections of the color blocks, adjacent to each other, on the base 11 is spaced by an orthogonal projection of the black matrix BM on the base 11.

The cover layer OC is arranged on the base 11, each cover layer OC is arranged on a side of the color filter layer 12 away from the base 11, and the cover layer OC may be made of an organic material such as resin. The cover layer OC on the base 11 includes a first cover layer OC1. For example, one cover layer OC is provided, the cover layer OC is the first cover layer OC1; alternatively, if multiple cover layers OC are provided, one of the multiple cover layers OC, which is closest to the base 11, is the first cover layer OC1. The first cover layer OC1 is disposed in contact with the color filter layer 12 for planarization.

Each optical compensation layer 13 is positioned on a side of the first cover layer OC1 away from the base 11 and is configured to compensate the phase delay of light emitted from the liquid crystal layer of the liquid crystal display panel.

The spacers 14 are located on a side of the first cover layer OC1 away from the base 11 and are in contact with one cover layer OC. For example, if one cover layer OC (i.e., the first cover layer OC1) is provided, the spacers 14 are in contact with the first cover layer OC1; or if multiple cover layers OC are provided, the spacers 14 may be in contact with the first cover layer OC1, or may be in contact with another cover layer OC other than the first cover layer OC1.

The spacers 14 may be made of an organic material, for example, polyimide, polycarbonate, polyacrylate, polyetherimide, or the like. The spacers 14 are configured to maintain a gap between the display substrate and the array substrate.

In the embodiment of the present disclosure, the optical compensation layer 13 is disposed on the base 11, so that when the display substrate is applied as a substrate on a light exiting side of the liquid crystal display panel, the light passes through the array substrate and the liquid crystal layer and is emitted to the display substrate, the optical compensation layer 13 can compensate the phase delay of the light emitted from the liquid crystal layer, so that after the light passes through the array substrate, the liquid crystal layer and the optical compensation layer, the total phase delay thereof is proximal to or equal to a preset value (for example, the preset value may be a midpoint value proximal to the visible light band, for example, at 530 nm), and the light reaches a preset polarization state, and when the liquid crystal display panel is in dark state, substantially all the light cannot be emitted out from the display substrate, thereby improving the problem of light leakage in dark state.

In addition, in the embodiment of the present disclosure, the spacers 14 are in contact with one cover layer OC, so that when the spacers 14 are manufactured by exposure and development, a developer can improve a wettability of a surface of the cover layer OC, and when an organic solution (for example, an alignment solution for manufacturing an alignment layer) is subsequently coated on the surface of the cover layer OC, a contact angle of the organic solution is reduced, and the organic solution can be more uniformly diffused on the surface of the cover layer, which is beneficial to improve uniformity of film formation.

In some implementations, the optical compensation layer 13 includes a +A compensation layer that satisfies: $nx1>ny1=nz1$, where $nx1$ is a refractive index of the +A compensation layer in a direction of an x axis in a plane thereof; $ny1$ is a refractive index of the +A compensation layer in a direction of a y axis in the plane thereof, the y axis being perpendicular to the x axis; $nz1$ is a refractive index of the +A compensation layer in a thickness direction thereof. The +A compensation layer is a cured liquid crystal film in which the orientations of liquid crystal molecules (i.e., directions of long axes of the liquid crystal molecules) are substantially the same. In order to align the liquid crystal molecules in a same direction, as shown in FIG. 2, in the embodiment of the present disclosure, the display substrate further includes: a first alignment layer PI1 corresponding to the optical compensation layer 13 one by one, the first alignment layer PI1 is located between the corresponding optical compensation layer 13 and the first cover layer OC1, and the first alignment layer PI1 is in contact with the corresponding optical compensation layer 13. In addition, the display substrate further includes a second alignment layer PI2, each optical compensation layer 13 is located between the second alignment layer PI2 and the first alignment layer PI1, and the second alignment layer PI2 is configured to align a liquid crystal layer of the liquid crystal display panel.

In some implementations, the optical compensation layer 13 includes a +C compensation layer, or a combination of +A and +C compensation layers. The +C compensation layer satisfies: $nz2>ny2=nx2$, where $nx2$ is a refractive index of the +C compensation layer in a direction of an x axis in a plane thereof; $ny2$ is a refractive index of the +C compensation layer in a direction of a y axis in the plane thereof, the y axis being perpendicular to the x axis; $nz2$ is a refractive index of the +C compensation layer in a thickness direction thereof. The +C compensation layer is a cured liquid crystal film. The material, thickness, and liquid crystal molecular orientation of each optical compensation layer 13 may be adjusted according to actual needs, as long as the compensation needs are satisfied.

It should be noted that, in FIG. 2, the first alignment layer PI1 and the optical compensation layer 13 each are illustrated as a single layer, but certainly, the first alignment layer PI1 and the optical compensation layer 13 each may also be multilayer, in such case, multiple first alignment layers PI1 and multiple optical compensation layers 13 are located between the first alignment layer PI1 and the second alignment layer PI2, and the multiple first alignment layers PI1 and the multiple optical compensation layers 13 are alternately arranged. Taking the first alignment layer PI1 and the corresponding optical compensation layer 13 as a compensation film layer group, two adjacent compensation film layer groups may contact each other, or may be separated by another film layer.

In some implementations, the cover layer OC is multilayer, in addition to the first cover layer OC1 described above, a second cover layer OC2 is further included by the cover layer OC, the second cover layer OC2 being located between the second alignment layer PI2 and the optical compensation layer 13 adjacent to the second alignment layer PI2.

The optical compensation layer 13 adjacent to the second alignment layer PI2 means that there is no other optical compensation layer 13 between the optical compensation layer 13 and the second alignment layer PI2, and does not mean that the optical compensation layer 13 and the second alignment layer PI2 must be in contact with each other.

Alternatively, as shown in FIG. 2, the spacer 14 is disposed in contact with the second cover layer OC2, and the second alignment layer PI2 covers at least partial area of the spacer 14 other than a contact area of the spacer 14 on the second cover layer OC2. Therefore, areas of the second cover layer OC2 not covered by the spacers 14 are at least partially covered by the second alignment layer PI2. The spacers 14 and the second cover layer OC2 may include a same material or different materials. When the materials of the spacers 14 and the second cover layer OC2 are the same, the spacers 14 and the second cover layer OC2 may be formed simultaneously by a same patterning process.

In a process for manufacturing the display substrate shown in FIG. 2, the black matrix BM and the color filter layer 12 may be formed first, and then the first cover layer OC1 is formed, and the first cover layer OC1 is subjected to a plasma process, and a surface of the first cover layer OC1 is rinsed by using a first solution; thereafter, the first alignment layer PI1, the optical compensation layer 13, and the second cover layer OC2 are sequentially formed. For example, the first solution is a potassium hydroxide solution. By performing the plasma process on the first cover layer OC1, impurities on the surface of the first cover layer OC1 can be removed, which plays a role of cleaning the first cover layer OC1 and improves the wettability of the surface of the first cover layer OC1, thus facilitating the reduction of the contact angle of the alignment liquid when the alignment liquid for forming the first alignment layer PI1 is coated on the first cover layer OC1. The surface of the first cover layer OC1 is washed by the first solution, so that the wettability of the surface of the first cover layer OC1 can be further improved, the contact angle of the alignment liquid is further reduced when the alignment liquid is coated, the alignment liquid can be more uniformly diffused on the surface of the first cover layer OC1, and the uniformity of film formation is favorably improved.

After the second cover layer OC2 is formed, the spacers 14 and the second alignment layer PI2 are sequentially formed. The process of forming the spacers 14 may specifically include: performing a plasma process on the second cover layer OC2, and then, forming a spacer material layer, and exposing and developing the spacer material layer, thereby obtaining a pattern of the spacers 14. The plasma process on the second cover layer OC2 can at least remove impurities on the surface of the second cover layer OC2, so that the spacer material layer is in close contact with the second cover layer OC2, and the stability of the formed spacers is improved.

Figure 3:
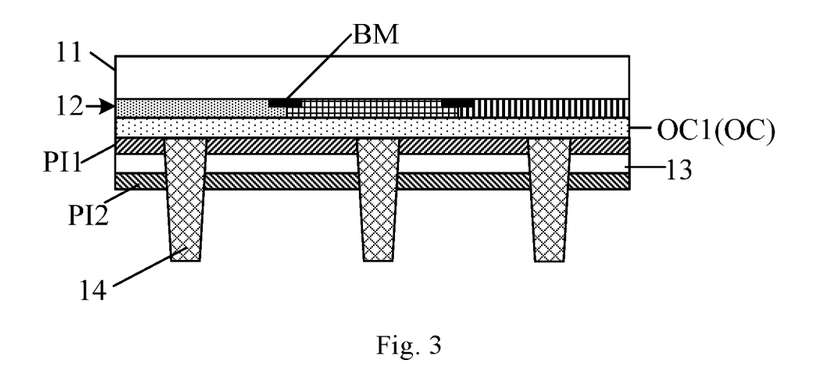
FIG. 3 is a schematic diagram of a display substrate according to some embodiments of the present disclosure.

FIG. 3 is a schematic diagram of a display substrate according to an embodiment of the present disclosure, and similarly to that shown in FIG. 2, the display substrate shown in FIG. 3 also includes a color filter layer 12, at least one cover layer OC, at least one optical compensation layer 13, and a plurality of spacers 14. Different from that shown in FIG. 2, in FIG. 3, the cover layer OC is a single layer, i.e. the first cover layer OC1. Each optical compensation layer 13 is located on a side of the first cover layer OC1 away from the base 11, and is configured to compensate the phase delay of light emitted from the liquid crystal layer of the liquid crystal display panel. The spacers 14 are located on the side of the first cover layer OC1 away from the base 11 and are in contact with the first cover layer OC1.

In addition, in FIG. 3, the display substrate further includes a first alignment layer PI1 and a second alignment layer PI2, the first alignment layer PI1 corresponds to the optical compensation layer 13 one by one, and the first alignment layer PI1 is located between the corresponding optical compensation layer 13 and the first cover layer OC1 and is in contact with the corresponding optical compensation layer 13, which is the same as that shown in FIG. 2. The first alignment layer PI1 covers at least partial area of the spacer 14 other than the contact area of the spacer 14 on the first cover layer OC1. Therefore, areas of the first cover layer OC1 not covered by the spacers 14 are at least partially covered by the first alignment layer PI1. The optical compensation layer 13 is located between the second alignment layer PI2 and the first cover layer OC1. A black matrix BM may further be disposed between the first cover layer OC1 and the base 11.

As shown in FIG. 3, the second alignment layer PI2 is in contact with the optical compensation layer 13. It should be noted that, FIG. 3 only schematically illustrates a case where the optical compensation layer 13 and the first alignment layer PI1 each are a single layer, which does not limit the present disclosure, for example, the optical compensation layer 13 and the first alignment layer PI1 each may be multilayer, in such case, first alignment layers PI1 and optical compensation layers 13 are alternately disposed between the first cover layer OC1 and the second alignment layer PI2, and the second alignment layer PI2 is in contact with the optical compensation layer 13 farthest away from the base 11.

In the process for manufacturing the display substrate shown in FIG. 3, the black matrix BM and the color filter layer 12 may be formed first, and then the first cover layer OC1 may be formed. Then, the first cover layer OC1 is subjected to a plasma process so as to remove at least impurities on the surface of the first cover layer OC1; then, a spacer material layer is formed, and the spacer material layer is exposed and developed, thereby obtaining a pattern of the spacers 14. After that, the first alignment layer PI1, the optical compensation layer 13, and the second alignment layer PI2 are formed in this order. During the process of developing the spacer material layer, a developing solution (for example, a potassium hydroxide solution) removes the spacer material layer in some regions, and washes the first cover layer OC1, so as to improve the wettability of the surface of the first cover layer OC1, so that the alignment solution for forming the first alignment layer PI1 can be more uniformly dispersed on the first cover layer OC1 when the first alignment layer PI1 is formed, thereby improving the film formation uniformity of the first alignment layer PI1.

Compared with FIG. 2, the structure of the display substrate shown in FIG. 3 is simpler, the cover layer OC is not required to be processed by an additional process step, the process is simpler, and the improvement of the productivity is facilitated.

An embodiment of the present disclosure further provides a method for manufacturing the display substrate described above, the method includes:

S0, forming a color filter layer on a base;

S1, forming at least one cover layer on a side of the color filter layer away from the base, where the at least one cover layer includes a first cover layer which is in contact with the color filter layer;

S2, forming at least one optical compensation layer, where each optical compensation layer is positioned on a side of the first cover layer away from the base and is configured to compensate a phase delay of light emitted from a liquid crystal layer of the liquid crystal display panel. For example, the optical compensation layer includes a +A film; and S3, forming a spacer, where the spacer is positioned on the side of the first cover layer away from the base and is in contact with one cover layer.

It should be noted that, the cover layer may be a single layer or multilayer; when the cover layer is the single layer, the cover layer is the first cover layer; when the cover layer is multilayer, one cover layer is the first cover layer. It should be noted that, the sequence of the above steps S1 to S3 is not limited, for example, when the cover layer is multilayer, one cover layer may be formed before all optical compensation layers are formed, or may be formed after all the optical compensation layers are formed.

Figure 4:
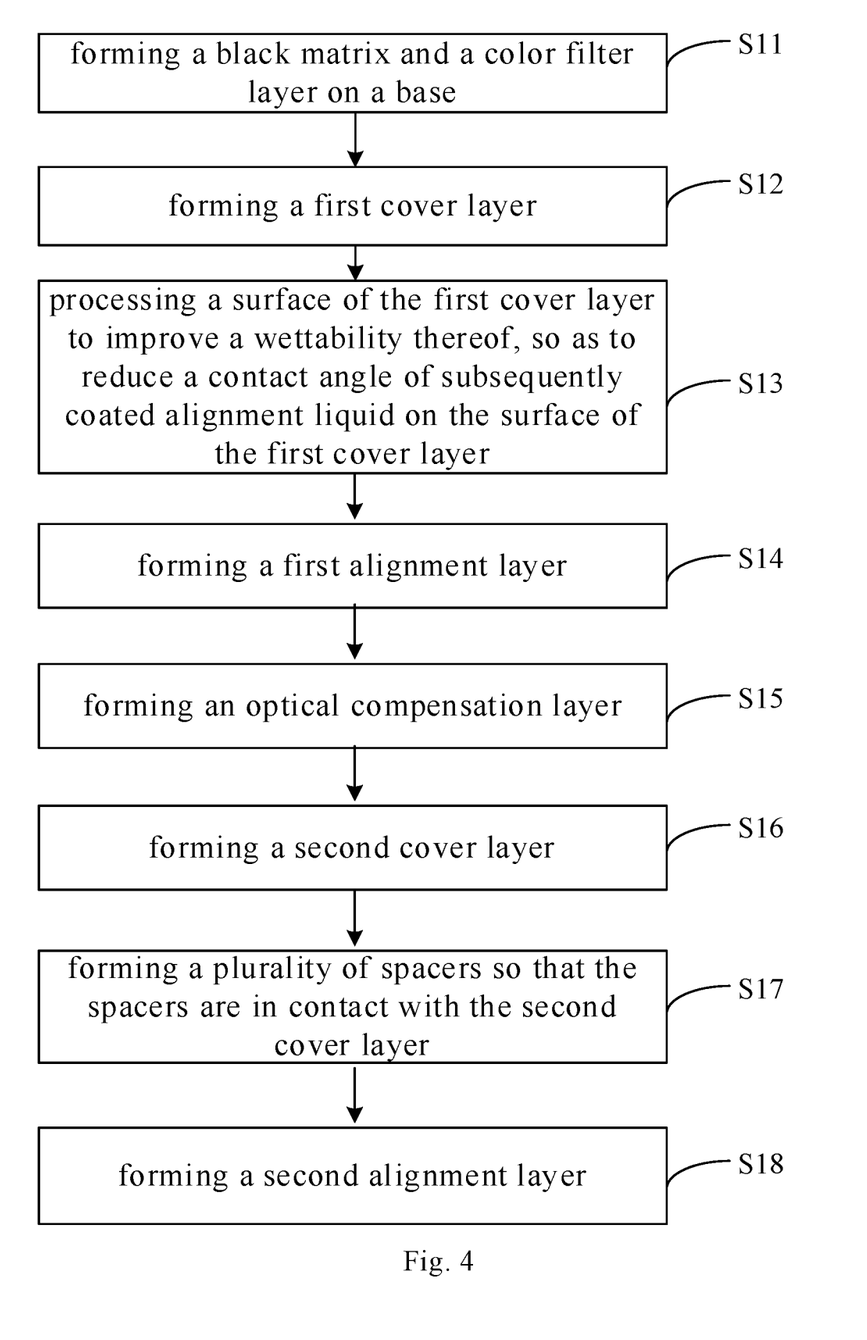
FIG. 4 is a flowchart of a method for manufacturing a display substrate according to some embodiments of the present disclosure.

FIG. 4 is a flowchart of a method for manufacturing a display substrate according to an embodiment of the present disclosure, and FIGS. 5A to 5G are schematic diagrams of a process for manufacturing a display substrate according to an embodiment of the present disclosure, and a case where the cover layer includes a first cover layer and a second cover layer and the optical compensation layer is a single layer is taken as an example for illustration.

Figure 5A:
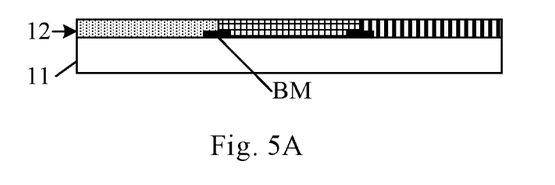
FIGS. 5A to 5G are schematic diagrams illustrating a process for manufacturing a display substrate according to some embodiments of the present disclosure.
Figure 5B:
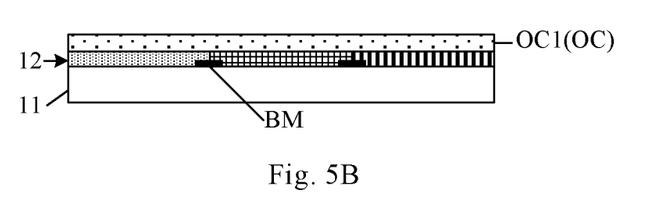
Figure 5C:
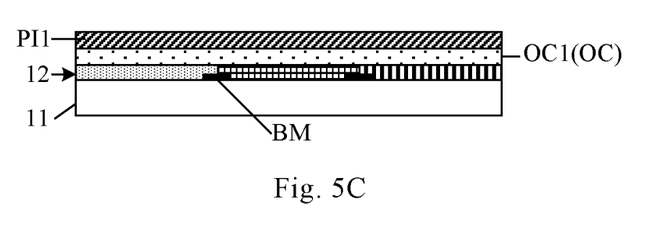
Figure 5D:
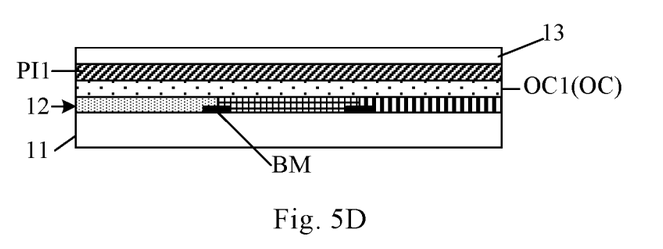
Figure 5E:
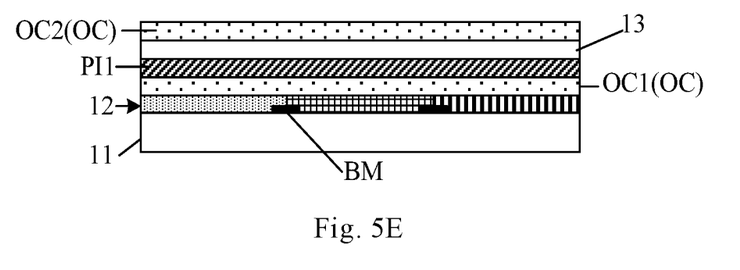
Figure 5F:
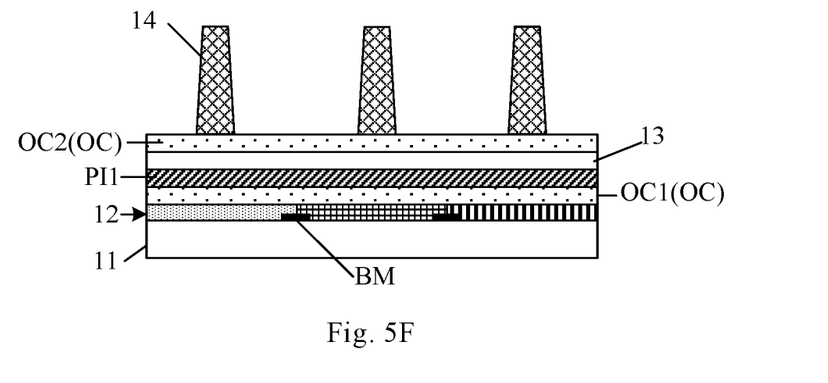
Figure 5G:
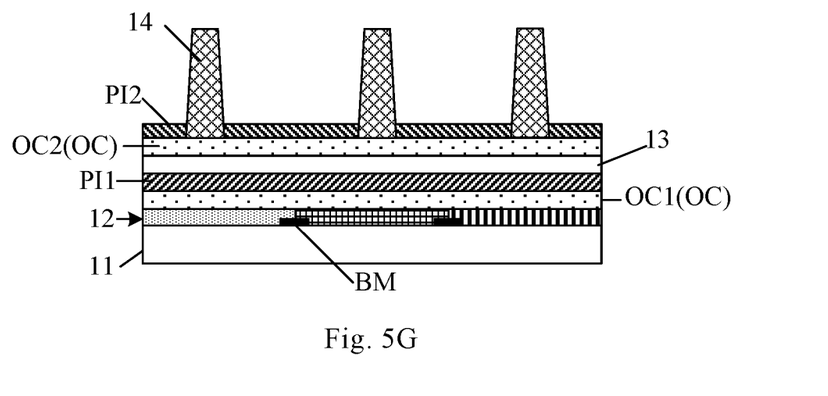

As shown in FIGS. 4 to 5G, the method includes following steps S11 to S18.

At step S11, as shown in FIG. 5A, the black matrix BM and the color filter layer 12 are formed on the base 11.

At step S12, as shown in FIG. 5B, the first cover layer OC1 is formed, where the first cover layer OC1 may be made of a resin material.

Since a surface of the resin material layer without being processed has poor wettability, when the alignment liquid is coated subsequently, the contact angle of the alignment liquid on the surface of the resin material layer is relatively large, so that the subsequently formed alignment liquid is unevenly diffused on the surface of the resin material layer. Therefore, after step S12, the following step S13 is performed.

At step S13, a surface of the first cover layer OC1 is processed to improve the wettability of the surface of the first cover layer OC1, so as to reduce the contact angle of the subsequently coated alignment liquid on the surface of the first cover layer OC1. For example, step S13 may include: performing a plasma process on the surface of the first cover layer OC1, and rinsing the surface of the first cover layer OC1 with a first solution, which can be used as a developing solution for subsequent formation of spacers. Illustratively, the first solution is a potassium hydroxide solution.

By performing the plasma process on the first cover layer OC1, impurities on the surface of the first cover layer OC1 can be removed, so that the first cover layer OC1 is cleaned, and the wettability of the surface of the first cover layer OC1 is improved, and thus, when an alignment liquid for forming the first alignment layer PI1 is subsequently coated on the first cover layer OC1, the contact angle of the alignment liquid is favorably reduced. The surface of the first cover layer OC1 is washed by the first solution, so that the wettability of the surface of the first cover layer OC1 can be further improved, the contact angle of the alignment liquid is further reduced when the alignment liquid is coated, the alignment liquid can be more uniformly diffused on the surface of the first cover layer OC1, and the uniformity of film formation is favorably improved.

After step S13, the following steps are performed.

At step S14, as shown in FIG. 5C, the first alignment layer PI1 is formed. For example, step S14 may include: coating an alignment liquid, and curing the alignment liquid to form a film layer to be aligned; the film layer to be aligned is then aligned (e.g., rubbed or photo-aligned) to obtain the first alignment layer PI1.

At step S15, as shown in FIG. 5D, the optical compensation layer 13 is formed. In some implementations, step S15 includes: forming and curing a liquid crystal material layer on the first alignment layer PI1 to form the optical compensation layer 13.

It should be noted that, the first alignment layer PI1 and the optical compensation layer 13 each may be multilayer, and in such case, the steps S14 and S15 may be performed alternately, so as to form multiple first alignment layers PI1 and multiple second alignment layers PI2, where the first alignment layers PI1 and the optical compensation layers 13 correspond to each other, and each first alignment layer PI1 is formed before the corresponding optical compensation layer 13 is formed.

At step S16, as shown in FIG. 5E, the second cover layer OC2 is formed, and the second cover layer OC2 is located on a side of all optical compensation layers 13 away from the base 11. The second cover layer OC2 may be made of a resin layer.

At step S17, as shown in FIG. 5F, a plurality of spacers 14 are formed, and the spacers 14 are disposed in contact with the second cover layer OC2.

In some implementations, the step S17 includes: performing a plasma process on the surface of the second cover layer OC2; then, forming a spacer material layer on the surface of the second cover layer OC2, and then exposing the spacer material layer, and developing the exposed spacer material layer by using the first solution, so as to obtain the pattern of the spacers 14.

The purpose of performing the plasma process on the second cover layer OC2 is to remove impurities on the surface of the second cover layer OC2, so that the spacer material layer is in close contact with the second cover layer OC2, and the stability of the formed spacers 14 is improved.

In addition, when the spacer material layer is developed, the first solution removes a partial region of the spacer material layer, and washes the second cover layer OC2, so as to improve the wettability of the surface of the second cover layer OC2, and thus, when the second alignment layer PI2 is formed subsequently, the solution for forming the second alignment layer PI2 can be more uniformly dispersed on the second cover layer OC2, so as to improve the film formation uniformity of the second alignment layer PI2.

At step S18, as shown in FIG. 5G, the second alignment layer PI2 is formed, the second alignment layer PI2 is located on the side of the second cover layer OC2 away from the base 11, and the second alignment layer PI2 covers at least partial area of the spacer 14 other than the contact area of the spacer 14 on the second cover layer OC2. For example, step S18 may include: coating an alignment liquid, and curing the alignment liquid to form a film layer to be aligned; the film layer to be aligned is then aligned (e.g., rubbed or photo-aligned) to obtain the second alignment layer PI2.

Figure 6:
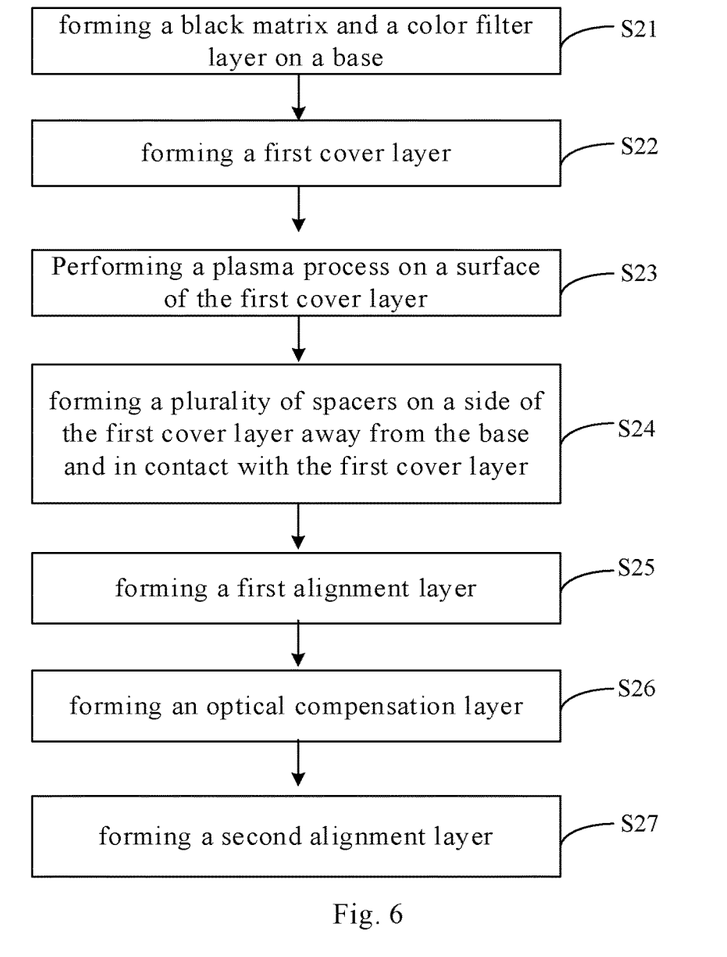
FIG. 6 is a flowchart illustrating a method for manufacturing a display substrate according to some embodiments of the present disclosure.

FIG. 6 is a flowchart of a method for manufacturing a display substrate according to some embodiments of the present disclosure, and FIGS. 7A to 7F are schematic diagrams of a process for manufacturing a display substrate according to some embodiments of the present disclosure, and a case where the cover layer includes a first cover layer OC1 and the optical compensation layer 13 is a single layer is taken as an example for illustration.

Figure 7A:
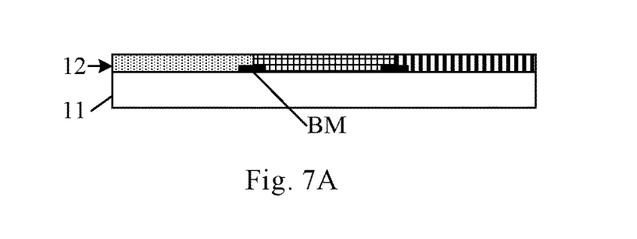
FIGS. 7A to 7F are schematic diagrams illustrating a process for manufacturing a display substrate according to some embodiments of the present disclosure.
Figure 7B:
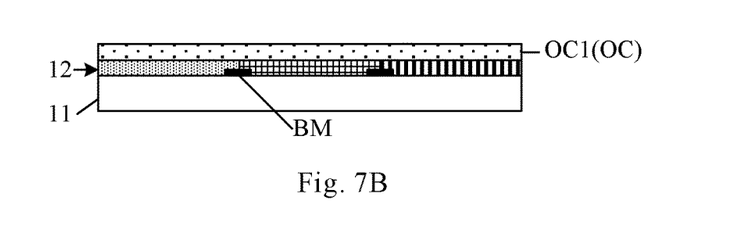
Figure 7C:
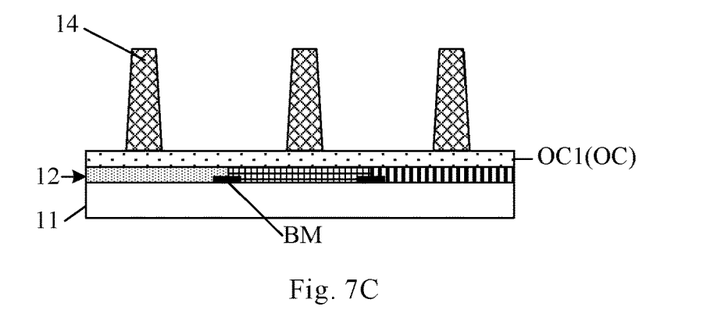
Figure 7D:
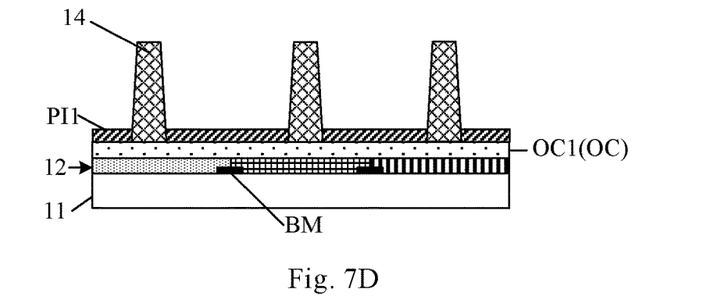
Figure 7E:
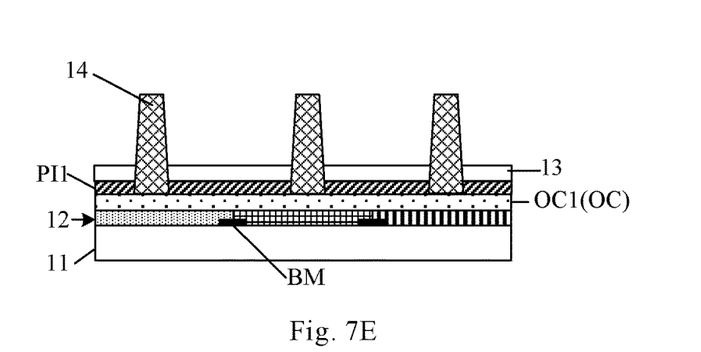
Figure 7F:
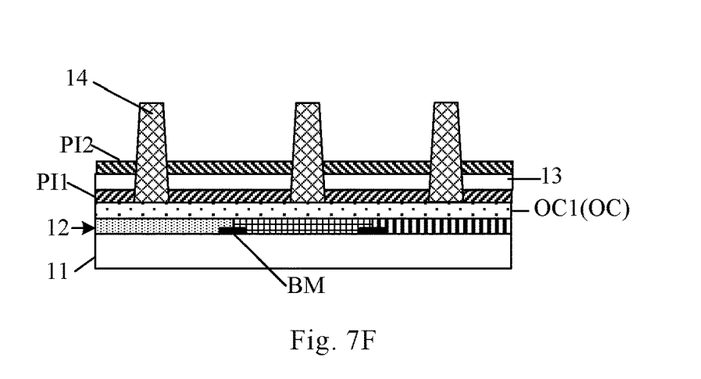

As shown in FIGS. 6 to 7F, the method includes following steps S21 to S27.

At step S21, as shown in FIG. 7A, the black matrix BM and the color filter layer 12 are formed on the base 11.

At step S22, as shown in FIG. 7B, the first cover layer OC1 is formed, where the first cover layer OC1 may be made of a resin material.

At step S23, a plasma process is performed on the surface of the first cover layer OC1. After the first cover layer OC1 is subjected to the plasma process, at least impurities on the surface of the first cover layer OC1 can be removed, so that the subsequently formed spacer material layer is in close contact with the first cover layer OC1, and the stability of the formed spacer is improved.

At step S24, as shown in FIG. 7C, a plurality of spacers 14 are formed, and the spacers 14 are located on the side of the first cover layer OC1 away from the base 11 and are disposed in contact with the first cover layer OC1.

In some implementations, the step S24 includes: forming a spacer material layer on the surface of the first cover layer OC1, and then exposing the spacer material layer, and developing the exposed spacer material layer by using a first solution to obtain the pattern of the spacers 14. Illustratively, the first solution is a potassium hydroxide solution. Meanwhile, the wettability of the surface of the first cover layer OC1 can be further improved by using the first solution for washing, so that the contact angle of the alignment liquid is further reduced when the alignment liquid is coated, the alignment liquid can be more uniformly diffused on the surface of the first cover layer OC1, and the uniformity of film formation is favorably improved.

At step S25, as shown in FIG. 7D, the first alignment layer PI1 is formed, for example, step S25 may include: coating an alignment liquid, and curing the alignment liquid to form a film layer to be aligned; the film layer to be aligned is then aligned (e.g., rubbed or photo-aligned) to obtain the first alignment layer PI1. The first alignment layer PI1 covers at least partial area of the spacer 14 other than the contact area of the spacer 14 on the first cover layer OC1.

In the process of forming the spacers 14, the first solution washes the surface of the first cover layer OC1, so that the wettability of the first cover layer OC1 is improved, the contact angle of the alignment liquid is reduced, the alignment liquid is diffused more uniformly, and the film formation uniformity of the first alignment layer PI1 is improved.

At step S26, as shown in FIG. 7E, the optical compensation layer 13 is formed. For example, step S26 includes: forming and curing a liquid crystal material layer to form the optical compensation layer 13. The liquid crystal material layer may be coated on the first alignment layer PI1.

At step S27, as shown in FIG. 7F, the second alignment layer PI2 is formed, and the second alignment layer PI2 is located on the side of all optical compensation layers 13 away from the base 11. For example, step S27 may include: coating an alignment liquid, and curing the alignment liquid to form a film layer to be aligned; the film layer to be aligned is then aligned (e.g., rubbed or photo-aligned) to obtain the second alignment layer PI2.

Step S27 is immediately adjacent to step S26 so that the second alignment layer PI2 is in contact with the optical compensation layer 13. When the optical compensation layer 13 are multilayer, the step of forming the second alignment layer PI2 is immediately adjacent to the step of forming one optical compensation layer 13.

As can be seen from the above-mentioned manufacturing process, in the method shown in FIGS. 4 to 5G, it is necessary to perform the plasma process on the film twice, and perform process (i.e., rinsing and developing) on the film twice with the first solution; by contrast, in the method shown in FIGS. 6 to 7F, the first solution washes the surface of the first cover layer OC1 when forming the spacers 14, so that the first cover layer OC1 does not need to be additionally processed, that is, in the method shown in FIGS. 6 to 7F, the film is subjected to one plasma process and one process (i.e., development) by the first solution, and compared with the method shown in FIGS. 4 to 5G, the method shown in FIGS. 6 to 7F has a simpler process and is beneficial to improving the throughput.

An embodiment of the present disclosure further provides a liquid crystal display panel, which includes an array substrate and the display substrate in the above embodiment, the array substrate and the display substrate are disposed opposite to each other, and a liquid crystal layer is further disposed between the array substrate and the display substrate.

It will be understood that the above embodiments are merely exemplary embodiments employed to illustrate the principles of the present disclosure, and the present disclosure is not limited thereto. It will be apparent to those skilled in the art that various changes and modifications can be made therein without departing from the spirit and scope of the present disclosure, and these changes and modifications are to be considered within the scope of the present disclosure.

The invention claimed is:

1. A display substrate, applied as a substrate on a light exiting side of a liquid crystal display panel, the display substrate comprising:
   a base;
   a color filter layer disposed on the base;
   at least one cover layer positioned on a side of the color filter layer away from the base, and comprising a first cover layer which is in contact with the color filter layer;
   at least one optical compensation layer, wherein each optical compensation layer is positioned on a side of the first cover layer away from the base and is configured to compensate a phase delay of light emitted from a liquid crystal layer of the liquid crystal display panel; and
   a spacer positioned on the side of the first cover layer away from the base and being in contact with one of the at least one cover layer,
   wherein the optical compensation layer is a cured liquid crystal film, the display substrate further comprises:
   a first alignment layer in one-to-one correspondence with the optical compensation layer, the first alignment layer being located between the optical compensation layer corresponding thereto and the first cover layer; and
   a second alignment layer;
   wherein each optical compensation layer is located between the second alignment layer and the first alignment layer.

2. The display substrate according to claim 1, further comprising:
   a black matrix positioned between the first cover layer and the base.

3. A liquid crystal display panel, comprising the display substrate according to claim 1.

4. The display substrate according to claim 1, wherein the at least one cover layer further comprises:
   a second cover layer between the second alignment layer and the optical compensation layer adjacent thereto;

the spacer is arranged in contact with the second cover layer, and the second alignment layer covers at least partial area of the spacer other than a contact area of the spacer on the second cover layer.

5. The display substrate according to claim 4, further comprising:
a black matrix positioned between the first cover layer and the base.

6. The display substrate according to claim 1, wherein the spacer is provided in contact with the first cover layer, and the first alignment layer covers at least partial area of the spacer other than a contact area of the spacer on the first cover layer.

7. The display substrate according to claim 6, further comprising:
a black matrix positioned between the first cover layer and the base.

8. The display substrate according to claim 6, wherein the second alignment layer is provided in contact with the optical compensation layer.

9. The display substrate according to claim 8, further comprising:
a black matrix positioned between the first cover layer and the base.

10. A method for manufacturing a display substrate, the display substrate being applied as a substrate on a light exiting side of a liquid crystal display panel, the method comprising:
forming a color filter layer on a base;
forming at least one cover layer on a side of the color filter layer away from the base, wherein the at least one cover layer comprises a first cover layer which is in contact with the color filter layer;
forming at least one optical compensation layer, wherein each optical compensation layer is positioned on a side of the first cover layer away from the base and is configured to compensate a phase delay of light emitted from a liquid crystal layer of the liquid crystal display panel; and
forming a spacer which is positioned on the side of the first cover layer away from the base and is in contact with one of the at least one cover layer,
the method further comprises:
before forming the spacer, performing a plasma process on a surface of the first cover layer;
forming a first alignment layer in one-to-one correspondence with the optical compensation layer, each first alignment layer being formed before forming the optical compensation layer corresponding thereto;
wherein the forming each optical compensation layer comprises:
forming and curing a liquid crystal material layer to form the optical compensation layer.

11. The method according to claim 10, further comprising:
before forming the color filter layer, forming a black matrix between the first cover layer and the base.

12. The method according to claim 10, wherein the at least one cover layer further comprises:
a second cover layer positioned on a side of all optical compensation layers away from the base;
before forming the first alignment layer, the method further comprising:
rinsing the surface of the first cover layer with a first solution;
the forming the spacer comprises:
performing a plasma process on a surface of the second cover layer;
forming a spacer material layer on the surface of the second cover layer;
exposing the spacer material layer, and developing the exposed spacer material layer by using the first solution to form a pattern of the spacer;
after forming the spacer, the method further comprising:
forming a second alignment layer, wherein the second alignment layer covers at least partial area of the spacer other than a contact area of the spacer on the second cover layer.

13. The method according to claim 12, further comprising:
before forming the color filter layer, forming a black matrix between the first cover layer and the base.

14. The method according to claim 10, wherein the forming the spacer comprises:
forming a spacer material layer on the surface of the first cover layer;
exposing the spacer material layer, and developing the exposed spacer material layer by using a first solution to form a pattern of the spacer;
wherein the first alignment layer is formed after the spacer is formed, and the first alignment layer covers at least partial area of the spacer other than a contact area of the spacer on the first cover layer;
after forming the spacer, the method further comprising:
forming a second alignment layer on a side of all optical compensation layers away from the base.

15. The method according to claim 14, wherein the forming the second alignment layer is immediately after forming one of the at least one optical compensation layer so that the second alignment layer is in contact with the optical compensation layer.

16. The method according to claim 14, further comprising:
before forming the color filter layer, forming a black matrix between the first cover layer and the base.

* * * * *